UNITED STATES PATENT OFFICE.

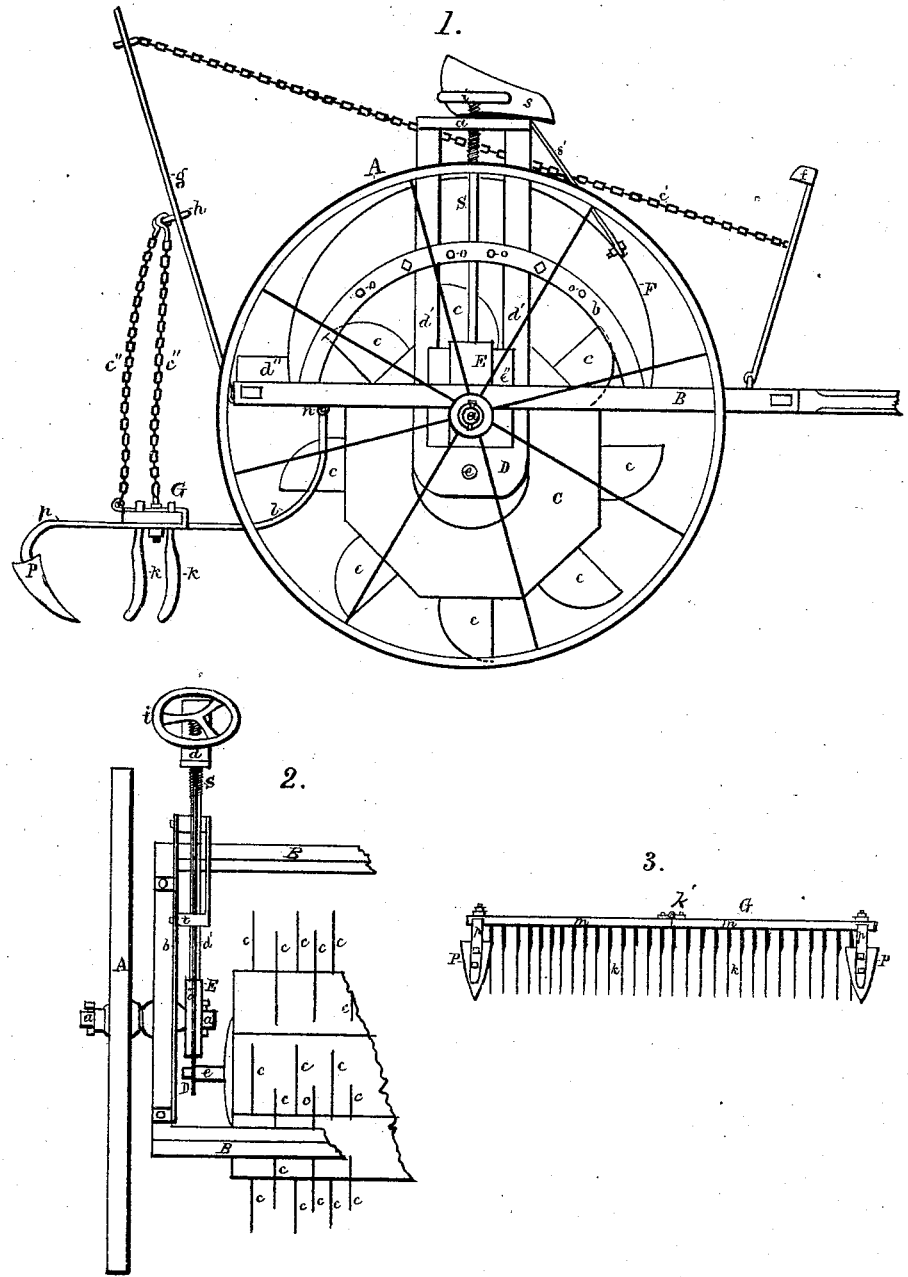

HORACE POOL, OF CLARKE COUNTY, OHIO.

IMPROVEMENT IN SOD-CUTTERS, CLOD-CRUSHERS, AND HARROWS.

Specification forming part of Letters Patent No. 151,717, dated June 9, 1874; application filed July 23, 1873.

*To all whom it may concern:*

Be it known that I, HORACE POOL, of the county of Clarke and State of Ohio, have invented certain Improvements in Earth-Working Machines, of which the following is a specification:

My invention relates to a combined machine for the purpose of performing the various kinds of labor necessary after the ground is broken by the plow, to prepare the same for planting or sowing; also, of removing therefrom stalks, stones, or other accumulations which may interfere with the cultivation of the crop to be planted.

Within a rectangular frame (with tongue attached) supported upon a pair of wheels is hung a roller of octagonal shape, having its bearings in the lower ends of sliding sash-frames at each side of the machine. From each of the sides of this octagonal roller project quadrant-shaped knives in rows at the proper distance apart to operate in cutting sod or earth. These knives have their rounded edges sharp, and are so placed in a series of alternate rows as to present their sharp edges in succession as the roller is rotated by the movement of the machine. The frames which form the bearings for the journals of the roller are made adjustable, so that they can be readily raised and lowered to suit the depth of cut required. They are supported from lateral movement by a semicircular arch above the main frame, which is provided with adjustable parts for suspending the roller perpendicularly or at an inclination, as preferred. The axles of the wheels are short sub-axles, their inner ends passing into or formed on a grooved rectangular block, which acts as guides to the raising and lowering frames which support the journals of the cutting or crushing cylinder. These latter are provided with screw rods or levers for operating them. A semi-cylindrical sheet-metal cover extends across the machine over the cylinder, which serves to protect the driver (whose seat is placed over it) from the dust and clods that may be thrown up by the rotation of the crushing-cylinder. A box is placed on the rear rail of the main frame, just behind the cover, for holding stone which may be gathered, (when the machine is used as a stone-rake,) and conveying them off the ground. A knife-harrow is attached behind the clod-crusher for the purpose of pulverizing the earth which has been cut and broken up by the latter. This knife-harrow is constructed with two or more rows of curved teeth (extending across the width of the machine) set into a wooden rail or plank, which is divided in the center, the two parts being hinged together, its object being to accommodate itself to any uneven surface of the ground when in operation. It is attached to the main frame by two curved bar-iron brackets, which are hinged to the under side of the rails in rear of the axle. The knives in this harrow are constructed so that it can be reversed, bringing the cutting-edges toward the rear. By reversing the rake it may be used as a stone-rake. Three furrowing-shovels are fastened by bolts and nuts to the beam of the harrow, so as to complete the operation of furrowing out the ground after it has been prepared by the crusher and harrow. The furrowing-plows are provided with iron beams, which extend under the beam of the harrow forward, and are doubled up over the top to give them additional strength. They can be removed when it is desired to use the harrow without them. The driver can regulate the depth of the harrow and furrowing-plows with his feet by pressing the foot-lever (which is attached at the front of the machine) forward, it being connected by a chain extending back over the cover of the machine to another upright lever at the rear, which is also connected by suspending-chains to the two parts of the harrow below it. It will thus be seen that the driver can have free use of his hands in controlling his team, raising and lowering the harrow and furrowing-plows with his feet alone.

Figure 1 is a side elevation of my combined earth-working machine. Fig. 2 is a sectional view, (from the front,) showing the right wheel and its axle, a portion of the frame, a section of the cylinder, and the raising and lowering mechanism. Fig. 3 is a rear elevation of the rake and furrowing-plows, the middle plow having been removed to show the hinge which connects the two parts together.

A are wheels, Figs. 1 and 2. Each wheel is provided with a separate axle, $a$, the frame B having boxes on the under side of the side bars, through which it is inserted into block E inside the main frame. A spindle-plate may be used instead and bolted to the block E, or cast on it. B is the main frame; $b$, a semicircular or arched bar, its ends bolted to the side rails of B, and at the top the bar $t$ fastened to it at the ends, which are turned at a right angle and bolted to $b$, so as to allow a sufficient space for the frame D to move up and down through it easily when raising or lowering the cylinder C, forming a guide-way for the same. The journals $e$ of cylinder C have their bearings in the lower ends of the sliding frames D. The cylinder is raised and lowered by the elevating screw-rods S being rotated by the hand-wheels $i$. The curved lever L, Fig. 4, may also be used to produce a similar result, the axle $a$ being inserted in the hole $i'$ of the fulcrum-bar $r$, and the journal $e$ being inserted in the hole $z$ of the lever, when power applied at the hooked end of the lever L will operate to raise and lower the attached cylinder C. I, however, prefer the screws S and their frames D and block E for this purpose. The head $d$ forms a nut for S. The cylinder C is made octagonal in form, and is provided with quadrant-shaped knives $c$, the knives in each row alternating with those of the next. The rounded or edged part of the knives is set toward the rear, so that they will sink into the ground as the cylinder is rotated. $d'$ $d'$ are the side bars of frames D. These frames can be set at an inclination by setting the guide-bars $t$ over toward the front or rear on the arch $b$, which latter is provided with a series of holes, $o$, for fastening the ends of $t$. F is a semi-cylindrical cover of sheet metal (or it may be of wood) bent over the top of the machine to protect the operator from dirt or dust thrown from cylinder C. $s$ is a seat for the operator, which is bolted on the cover F. $f$ is a foot-lever hinged to the front bar of the frame B (or an extension of cover F) in front of the seat. It has a head-piece curved inward to fit the feet of the operator. Chain $c'$ extends from it backward over the cover to the rear raising-lever $g$, which is hinged, in like manner, by its lower end, to the rear rail of the main frame. $d''$ is a box for holding stone gathered from the ground. A similar box may be placed on the front of the machine, if required. G, Figs. 1 and 2, is a rake for pulverizing the soil. It is provided with peculiar-shaped teeth $k\,k$. They are made flat and slightly curved edgewise, being thick on the back edge, while the front or curved edge is sharpened to cut and pulverize any clods or turf remaining after the cylinder passes over the ground. The rake is in two parts, $m\,m$, which are hinged together by hinge $k'$. This enables it more readily to conform to the surface of the ground. By reversing rake G the blunt edges of the teeth are forward. In this manner it is used as a stone-rake.

When used as a stalk-cutter, I first drag down the stalks with a pole in the usual manner; then cross the field at right angles with my machine, cutting the stalks into short sections (so that they will not impede the plow) with the knives of cylinder C.

The harrow can either be removed or held up by the lever and chains attached to it.

My machine is intended, when used as a pulverizer and furrower, to follow the breaking-plows and thoroughly prepare the ground for planting.

It is obvious that furrowing-plows with planting attachments may be used with my machine, or drills or other seeders may be attached, so as to make the process of clod-crushing, harrowing, furrowing, and planting complete in one operation.

What I claim is—

The furrowing-plows P, with their attaching-beams, in combination with a reversible rake, G, brackets $l$, frame B, axles $a$, wheels A, and a sod-cutting roller, C, with its accessories, in the manner described, for the purpose set forth.

HORACE POOL.

Attest:
B. C. CONVERSE,
LEMON POOL.